(12) United States Patent
Pai et al.

(10) Patent No.: US 8,885,108 B2
(45) Date of Patent: Nov. 11, 2014

(54) DEVICES, SYSTEMS AND METHODS FOR CONTROLLING TV

(75) Inventors: Yi-Ming Pai, Changua (TW); Chin-Sheng Lee, Taoyuan (TW); Yu-Tsung Hsu, Taoyuan (TW)

(73) Assignee: Hannstar Display Corp., New Taipei (TW)

( * ) Notice: Subject to any disclaimer, the term of this patent is extended or adjusted under 35 U.S.C. 154(b) by 263 days.

(21) Appl. No.: 13/424,777

(22) Filed: Mar. 20, 2012

(65) Prior Publication Data

US 2012/0327308 A1    Dec. 27, 2012

(30) Foreign Application Priority Data

Jun. 27, 2011   (TW) .............................. 100122400 A

(51) Int. Cl.
| | |
|---|---|
| *H04N 5/44* | (2011.01) |
| *H04N 21/441* | (2011.01) |
| *H04N 21/45* | (2011.01) |
| *H04N 21/422* | (2011.01) |
| *H04N 21/442* | (2011.01) |
| *H04N 21/475* | (2011.01) |

(52) U.S. Cl.
CPC ....... *H04N 21/42204* (2013.01); *H04N 21/441* (2013.01); *H04N 21/4532* (2013.01); *H04N 21/44213* (2013.01); *H04N 21/475* (2013.01)
USPC ........... 348/734; 348/736; 348/725; 348/723; 348/719; 348/714; 348/636; 348/680; 348/693; 348/523; 348/553; 348/564; 348/565; 348/567; 348/465; 348/231.3; 348/94; 348/14.02; 348/14.03; 348/14.04; 348/14.05; 715/700; 715/727; 715/733; 715/750; 725/30; 725/34; 725/39; 725/55; 725/81; 725/98; 725/117; 725/118; 725/140; 725/145; 725/147; 725/148; 725/152

(58) Field of Classification Search
USPC ......... 348/734, 465, 553, 564, 565, 567, 719, 348/725, 736, 723, 714, 636, 680, 693, 523, 348/231.3, 94, 14.02, 14.03, 14.04, 14.05; 715/700, 727, 733, 750; 725/30, 34, 725/39, 55, 81, 98, 117, 118, 140, 145, 147, 725/148, 152
See application file for complete search history.

(56) References Cited

U.S. PATENT DOCUMENTS

| | | | |
|---|---|---|---|
| 6,898,424 B2 * | 5/2005 | Nishida ......................... | 455/420 |
| 6,906,696 B2 * | 6/2005 | Allport ......................... | 345/156 |

(Continued)

FOREIGN PATENT DOCUMENTS

| | | |
|---|---|---|
| CN | 101859487 A | 10/2010 |
| CN | 101883224 A | 11/2010 |
| EP | 1 571 846 A2 | 9/2005 |

*Primary Examiner* — Jefferey Harold
*Assistant Examiner* — Mustafizur Rahman
(74) *Attorney, Agent, or Firm* — Muncy, Geissler, Olds & Lowe, P.C.

(57) ABSTRACT

A TV control device, for an external TV device includes a storage unit storing a user identification code and user setting data corresponding to the user identification code, and a wireless communication unit transmitting a control signal to the external TV device according to the user identification code and the user setting data, wherein the external TV device determines a TV setting of the external TV device according to the user identification code and the user setting data when the external TV device receives the control signal.

23 Claims, 5 Drawing Sheets

(56) References Cited

U.S. PATENT DOCUMENTS

| | | |
|---|---|---|
| 7,102,688 B2 * | 9/2006 | Hayes et al. .................. 348/465 |
| 8,473,865 B2 * | 6/2013 | Huang et al. .................. 715/810 |
| 2001/0030644 A1 * | 10/2001 | Allport ......................... 345/173 |
| 2002/0140855 A1 * | 10/2002 | Hayes et al. .................. 348/465 |
| 2009/0133051 A1 | 5/2009 | Hildreth |
| 2009/0276324 A1 * | 11/2009 | Rothschild ..................... 705/26 |
| 2010/0313169 A1 * | 12/2010 | Huang et al. .................. 715/835 |
| 2011/0083141 A1 * | 4/2011 | Westberg et al. ............... 725/31 |
| 2011/0138327 A1 | 6/2011 | Scott et al. |
| 2011/0138416 A1 * | 6/2011 | Kang et al. ..................... 725/39 |
| 2011/0255012 A1 | 10/2011 | Hsieh et al. |

* cited by examiner

DEVICES, SYSTEMS AND METHODS FOR CONTROLLING TV

CROSS REFERENCE TO RELATED APPLICATIONS

This application claims priority of Taiwan Patent Application No. 100122400, filed on Jun. 27, 2011, the entirety of which is incorporated by reference herein.

BACKGROUND OF THE INVENTION

1. Field of the Invention

The disclosure relates generally to a TV control device, and more particularly relates to a TV control device for a user to define.

2. Description of the Related Art

Nowadays a TV has only few hot-keys for a user to preset, such as presetting some favorite TV channels, and the user can switch between these preset TV channels by the hot-keys on a remote control. However, there is only one remote control used by more than one user, and the number of hot-keys on a remote control is limited, such that it is hard to satisfy all the users. Also, because the remote control is shared, and the hot-keys on the remote control may be changed by all users, a user may switch to the incorrect channel.

Furthermore, a conventional TV, the TV channels are passively switched by a user, not automatically switched to a proper TV channel according to the user in front of the TV.

BRIEF SUMMARY OF THE INVENTION

An embodiment of a TV control device, for an external TV device, comprising: a storage unit, storing a user identification code and user setting data corresponding to the user identification code; and a wireless communication unit, a control signal to the external TV device according to the user identification code and the user setting data, wherein the external TV device determines a TV setting of the external TV device according to the user identification code and the user setting data when the external TV device receives the control signal.

An embodiment of a TV control system is provided, comprising: a TV control device, comprising: a storage unit storing a user identification code and user setting data corresponding to the user identification code; and a wireless communication unit, generating a control signal according to the user identification code and the user setting data; and a TV device, comprising: a TV wireless communication unit receiving the control signal; a processor unit determining a TV setting according to the user identification code corresponding to the control signal; and a display unit, displaying a related TV program according to the TV setting.

An embodiment of a TV device, comprising: a detection unit, receiving a user identification signal; a TV storage unit, storing first user setting data corresponding to a first user identification code; and a processor unit, determining whether the user identification signal has the first user identification code, and determining a TV setting according to the first user setting data when the user identification signal has the first user identification code; and a display unit, displaying a related TV program according to the TV setting.

An embodiment of a TV control method, comprising: storing a user identification code and user setting data corresponding to the user identification code in a TV control device; transmitting a control signal to a TV device according to the user identification code and the user setting data; determining a TV setting of the TV device according to the control signal; and displaying a related TV program according to the TV setting.

BRIEF DESCRIPTION OF DRAWINGS

The invention will become more fully understood by referring to the following detailed description with reference to the accompanying drawings, wherein.

DETAILED DESCRIPTION OF THE INVENTION

The making and using of the embodiments of the present invention are discussed in detail below. It should be appreciated, however, that the embodiments provide many applicable inventive concepts that can be embodied in a wide variety of specific contexts. The specific embodiments discussed are merely illustrative of specific ways to make and use the invention, and do not limit the scope of the invention.

Figure 1:
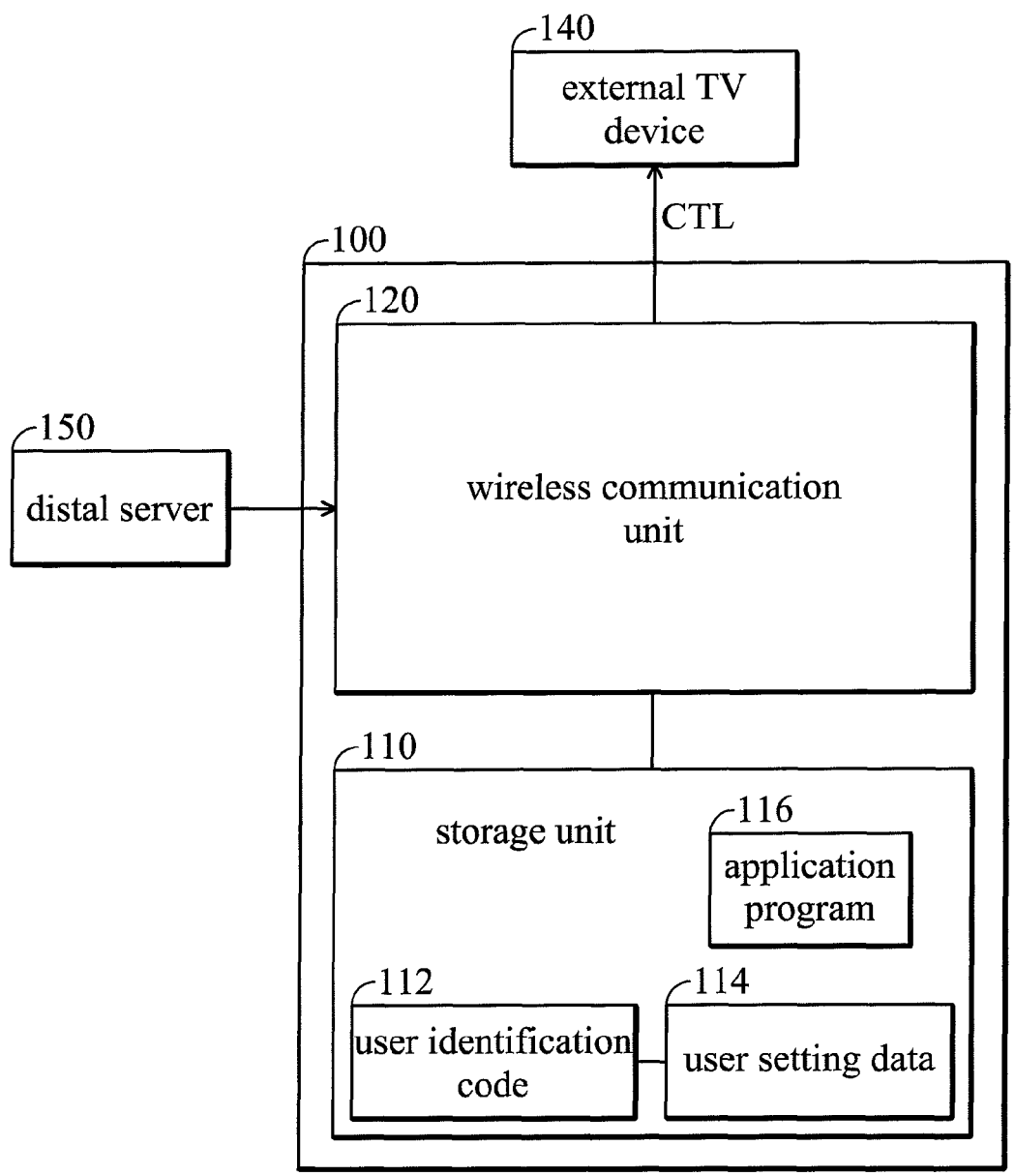
FIG. 1 is a schematic diagram illustrating an embodiment of a TV control device 100.

FIG. 1 is a schematic diagram illustrating an embodiment of a TV control device 100. The TV control device 100 comprises a storage unit 110 and a wireless communication unit 120. The storage unit 110 stores a user identification code 112 and user setting data 114. The wireless communication unit 120 sends a control signal CTL to an external TV device 140 according to the user identification code 112 and the user setting data 114. For example, the wireless communication unit 120 may send the control signal CTL to an external TV device 140 via wireless network or blue-tooth wireless transmission. In an embodiment, the user setting data 114 may comprise a favorite channels setting, an image setting, or an audio setting. Therefore, when the external TV device 140 receives the control signal CTL, the external TV device 140 can perform related settings according to the user identification code 112 and the user setting data 114. For example, a user can edit the user setting data 114 in the TV control device 100, such as a user's preferred channel list, TV image display setting, or playing mode of the audio, etc., such that the external TV device 140 can apply the settings when the external TV device 140 receives the control signal CTL. In an embodiment, the external TV device 140 may further build a data base according to the user identification code 112 and the user setting data 114, so that multiple users can use the custom setting and watch the TV program quickly.

In some embodiments, the TV controlling management may be performed by an application program. For example, the TV control device 100 may be an electrical communication device which is able to execute an application program, such as a smart phone, or tablet computer. The TV control device 100 may download an application program 116 for TV controlling from a distal server 150, and store the application program 116 in the storage unit 110. Therefore, a user can manage and set his/her user setting data 114 by the application program 116, and the wireless communication unit 120 generates the control signal CTL according the application program 116 in order to remote-set the external TV device 140. Accordingly, a user can download the application program 116 to any electrical communication device which is able to execute an application program, such that the management of the TV channels and customizing TV channels can be performed.

Figure 2:
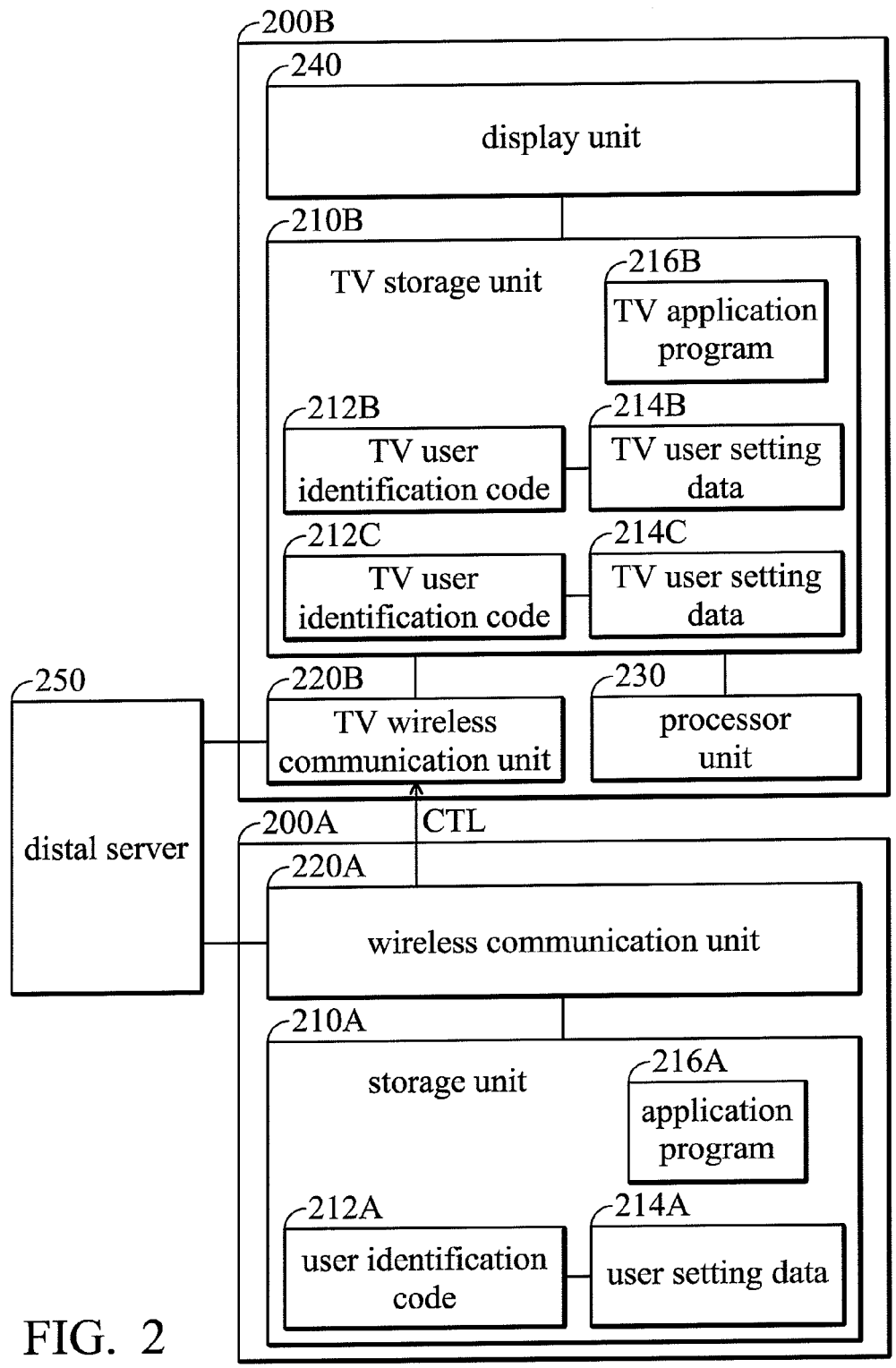
FIG. 2 is a schematic diagram illustrating an embodiment of a TV control system.

FIG. 2 is a schematic diagram illustrating an embodiment of a TV control system. The TV control system comprises a TV control device 200A and a TV device 200B.

The TV control device 200A comprises a storage unit 210A and a wireless communication unit 220A. The storage unit 210A stores a user identification code 212A and user setting data 214A corresponding to the user identification code 212A. The wireless communication unit 220A sends a control signal CTL to a TV wireless communication unit 220B of the TV device 200B according to the user identification code 212A and the user setting data 214A. For example, the wireless communication unit 220A may send the control signal CTL to the TV wireless communication unit 220B via wireless network or blue-tooth wireless transmission. In an embodiment, the user setting data 214A may comprise a favorite channels setting, an image setting, or an audio setting. The TV device 200B comprises a TV storage unit 210B and the TV wireless communication unit 220B, a processor unit 230, and a display unit 240. The TV storage unit 210B stores a TV user identification code 212B and TV user setting data 214B corresponding to the TV user identification code 212B.

In an embodiment, when the TV wireless communication unit 220B receives the control signal CTL, the processor unit 230 determines whether the user identification code 212A of the control signal CTL is the same as the TV user identification code 212B. If so, the TV device 200B may directly apply the setting of the TV user setting data 214B. Then, the display unit 240 displays the related TV program according to the setting of the TV user setting data 214B. In another embodiment, the TV storage unit 210B may have a plurality of TV user identification codes, and TV user setting data corresponding to each of the TV user identification codes (ex. TV user identification codes 212B, 212C, and related TV user setting data 214B, 214C). Accordingly, the processor unit 230 determines whether the user identification code 212A of the control signal CTL is the same as one of the TV user identification codes 212B and 212C. If so, the TV device 200B may directly apply the setting of the TV user setting data which corresponds to the matched user identification code.

On the other hand, when the processor unit 230 determines that the user identification code 212A of the control signal CTL is different from the TV user identification code 212B, the TV storage unit 210B may be added a set of a TV user identification codes 212C and TV user setting data 214C for storing the user identification code 212A and the user setting data 214A accordingly. Therefore, the user can use the custom setting and watch the TV program quickly, and the display unit 240 displays the related TV program according to the setting of the TV user setting data 214B.

In some illustrated embodiments, because the user of the user identification code 212A can edit and change the user setting data 214A on the TV control device 200A, the user setting data 214A is possibly different from the TV user setting data 214B, even though the processor unit 230 determines that the user identification code 212A of the control signal CTL is the same as the TV user identification code 212B. Thus, in an embodiment, after the processor unit 230 determines that the user identification code 212A is the same as the TV user identification code 212B, the processor unit 230 further determines whether the user setting data 214A is the same as the TV user setting data 214B. If so, the steps are the same as described above, wherein the TV device 200B may directly apply the setting of the TV user setting data 214B, and then the display unit 240 displays the related TV programs according to the setting of the TV user setting data 214B. If not, the processor unit 230 updates the setting data by replacing the content of the user setting data 214B with the content of the TV user setting data 214A. And then, the steps are the same as described above, wherein the TV device 200B may directly apply the setting of the updated TV user setting data 214B, and the display unit 240 displays the related TV program according to the setting of the updated TV user setting data 214B.

In some embodiments, the management and execution of the TV control system may be performed by an application program. For example, the TV control device 200A may be an electrical communication device which is able to execute an application program, such as smart phone, or tablet computer. The TV control device 200A may download an application program 216A for TV controlling from a distal server 250, and store the application program 216A in the storage unit 210A. Therefore, a user can manage and set his/her user setting data 214A by the application program 216A, and the wireless communication unit 220A generates the control signal CTL according the application program 216A in order to remote-set the TV device 200B. Accordingly, a user can download the application program 216A to any electrical communication device which is able to execute an application program, such that the management of the TV channels and customizing TV channels can be performed.

The TV device 200B may also be an electrical display device which is able to execute an application program. The TV device 200B can download a TV application program 216B for TV controlling from a distal server 250, and store the TV application program 216B in the storage unit 210B. When the wireless communication unit 220B receives the control signal CTL, the processor unit 230 executes the TV application program 216B and determines the TV user setting data 214B or 214C according to the TV application program 216B and the control signal CTL, wherein the TV user setting data 214B or 214C is determined based on the user identification code 212A of the control signal CTL. Therefore, a user can download the application program 216A and the TV application program 216B to any electrical communication device and TV device which are able to execute an application program, such that the management of the TV channels and customizing TV channels can be performed.

Figure 3:
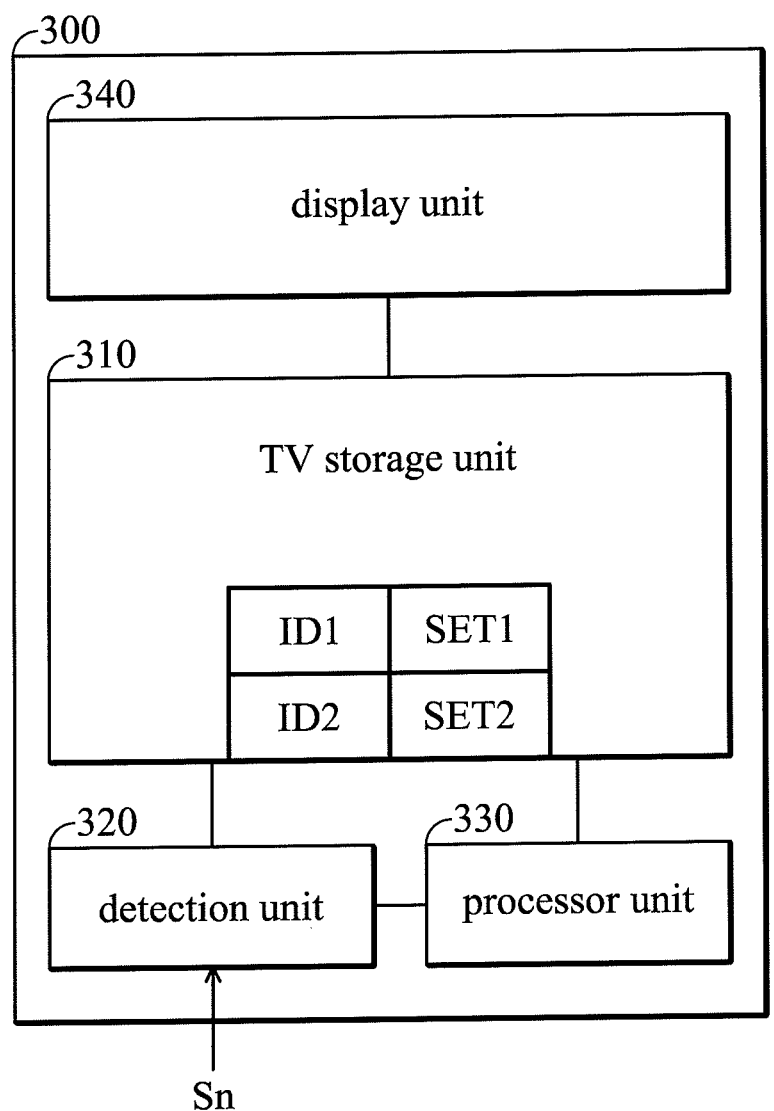
FIG. 3 is a schematic diagram illustrating an embodiment of a TV device 300.

FIG. 3 is a schematic diagram illustrating another embodiment of a TV device. In this embodiment, the TV device 300 can identify a user in front of the TV device 300 by a detection unit 320, and automatically provide proper TV programs to the user. The TV device 300 comprises a TV storage unit 310, a detection unit 320, a processor unit 330, and a display unit 340. The TV storage unit 310 stores a user identification code ID1 and user setting data SET1 corresponding to the user identification code ID1, and a user identification code ID2 and user setting data SET2 corresponding to the user identification code ID2. When the detection unit 320 receives a user identification signal Sn, the processor unit 330 determines whether the user identification signal Sn has the user identification code ID1 or the user identification code ID2. When the processor unit 330 determines that the user identification signal Sn has the user identification code ID1, the processor unit 330 sets the TV device 300 according to the user setting data SET1, and the display unit 340 displays related TV program according to the user setting data SET1. Similarly, when the processor unit 330 determines that the user identification signal Sn has the user identification code ID2, the processor unit 330 sets the TV device 300 according to the user setting data SET2, and the display unit 340 displays related TV program according to the user setting data SET2. In some embodiments, if the processor unit 330 determines that the user identification signal Sn does not have either the user identification code ID1 or the user identification code ID2, the TV device 300 displays the TV program according to the original setting.

In an embodiment, when the processor unit 330 determines that the user identification signal Sn has both the user identification code ID1 and the user identification code ID2, the processor unit 330 may further compare the content between the user setting data SET1 and the user setting data SET2, and set the TV device 300 accordingly. For example, if the channel list of the user setting data SET1 comprises General channels, Parental Guidance channels, and Restricted channels, but the channel list of the user setting data SET2 has only General channels, the processor unit 330 will set the channel list of the TV setting to only have General channels. Therefore, when the detection unit 320 detects that there is a restricted user in front of the TV device, the TV device will switch to the proper channel even though an adult may be watching a Restricted channel, such that the under age user can be protected. The comparison between the user setting data SET1 and the user setting data SET2 is not limited thereto. The setting of the TV device 300 can be set based on the union of the channels lists, the priority of the users, or the authority of the users.

In an embodiment, the detection unit 320 may be an image capture device (ex. Video camera), wherein the processor unit 330 determines the user identification code based on the captured image, such as human face recognition. Therefore, the TV device 300 can automatically provide more proper TV programs by detecting the users in front of the TV device 300 in real time.

Figure 4:
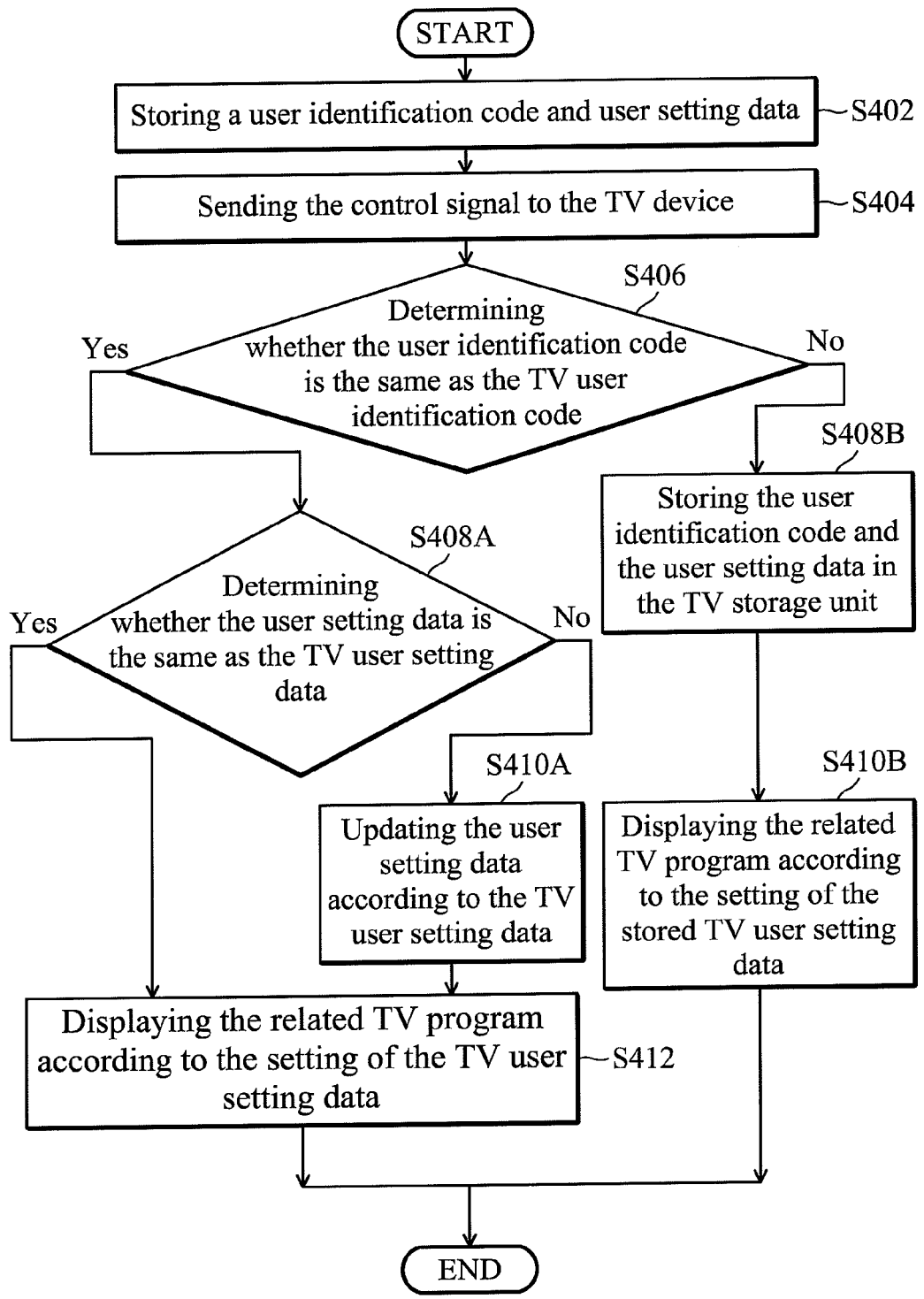
FIG. 4 is a flowchart of an embodiment of a method for the TV control system shown in FIG. 2.

FIG. 4 is a flowchart of an embodiment of a method for the TV control system shown in FIG. 2. In step S402, a user identification code 212A and user setting data 214A corresponding to the user identification code 212A are stored to the storage unit 210A of the TV control device 200A. In step S404, the wireless communication unit 220A sends the control signal CTL to the TV wireless communication unit 220B of the TV device 200B. Next, in the step S406, the processor unit 230 determines whether the user identification code 212A of the control signal CTL received by the TV wireless communication unit 220B is the same as one of the TV user identification codes 212B of the TV device 200B. If so, the process will proceed to step S408A, if not, the process will proceed to step S408B.

In step S408A, the processor unit 230 determines whether the user setting data 214A is the same as the TV user setting data 214B. If so, the process will proceed to the step S412. If not, the process will proceed to the step S410A. In step S410A, the processor unit 230 updates the user setting data 214B according to the TV user setting data 214A. In the step S412, the display unit 240 displays the related TV program according to the setting of the updated TV user setting data 214B.

In step S408B, the user identification code 212A and the user setting data 214A are stored in the TV storage unit 210B. For example, are stored as a TV user identification code 212D and the TV user setting data 214D. In the step S410B, the display unit 240 displays the related TV program according to the setting of the stored TV user setting data (ex. the TV user setting data 214D).

In some embodiments of the step S406, when the processor 230 determines that the user identification code 212A is different from the TV user identification code 212B, the processor 230 continues to determine whether the user identification code 212A is different from the TV user identification code 212C, and so on. Therefore, the step S408 proceeds when the user identification code 212A differs from all of the TV user identification codes in the TV storage unit 210B.

Figure 5:
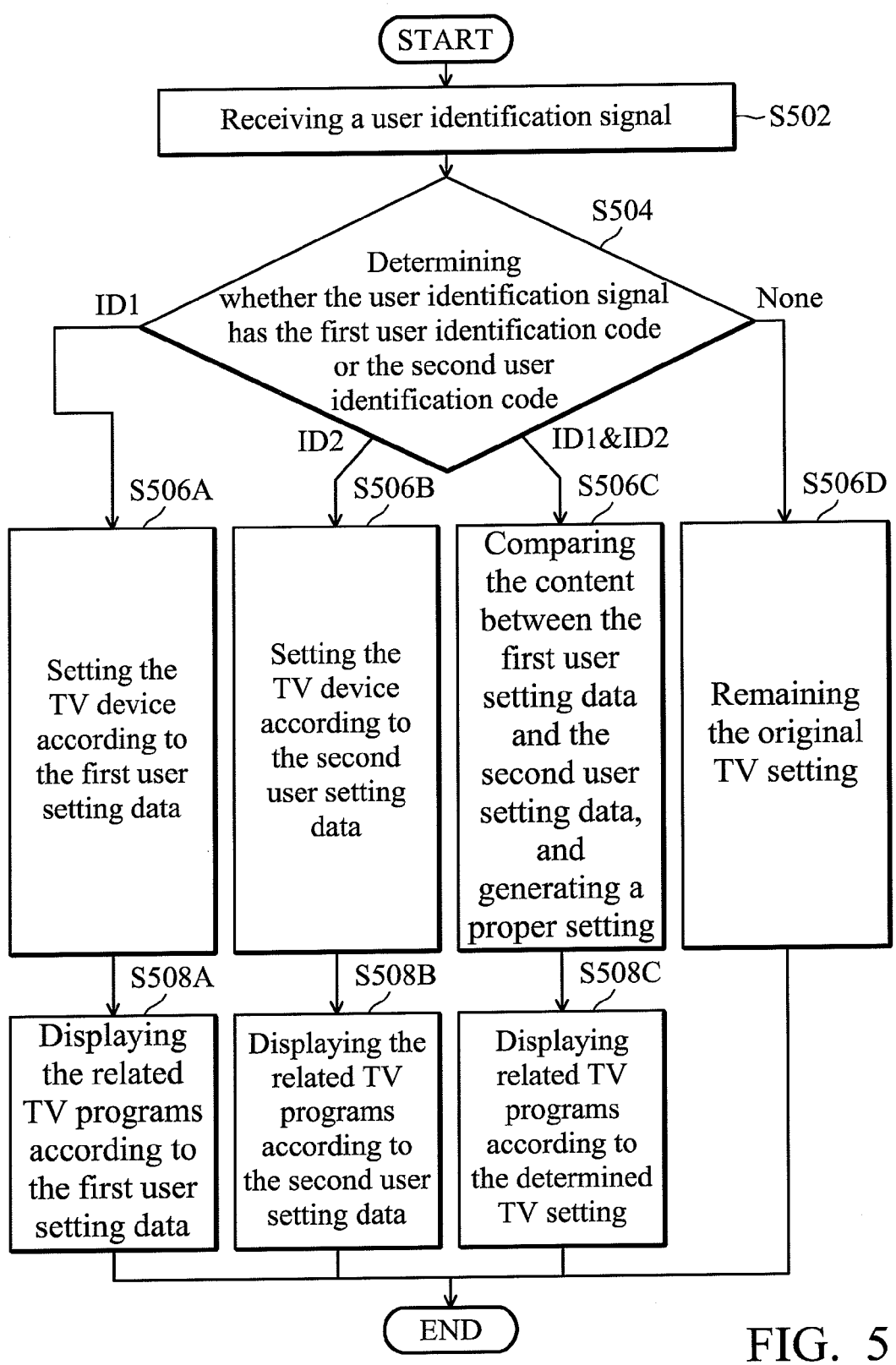
FIG. 5 is a flowchart of an embodiment of a method for the TV device shown in FIG. 3.

FIG. 5 is a flowchart of an embodiment of a method for the TV device shown in FIG. 3. In the step S502, the detection unit 320 receives a user identification signal Sn. In the step S504, the processor unit 330 determines whether the user identification signal Sn has the user identification code ID1 or the user identification code ID2. When the processor unit 330 determines that the user identification signal Sn only has the user identification code ID1, the process will proceed to step S506A. When the processor unit 330 determines the user identification signal Sn only has the user identification code ID2, the process will proceed to step S506B. When the processor unit 330 determines the user identification signal Sn has both the user identification code ID1 and the user identification code ID2, the process will proceed to step S506C. When the processor unit 330 determines that the user identification signal Sn does not have either the user identification code ID1 or the user identification code ID2, the process will proceed to step S506D.

In step S506A, the processor unit 330 sets the TV device 300 according to the user setting data SET1. Next, in the step S508A, the display unit 340 displays related TV programs according to the user setting data SET1.

In step S506B, the processor unit 330 sets the TV device 300 according to the user setting data SET2. Next, in the step S508B, the display unit 340 displays related TV program according to the user setting data SET2.

In step S506C, the processor unit 330 further compares the content between the user setting data SET1 and the user setting data SET2, and generates a proper setting accordingly. For example, the TV setting can be determined based on the union of the channels lists, the priority of the users, or the authority of the users. Next, in the step S508C, the display unit 340 displays related TV programs according to the determined TV setting.

In step S506D, the TV device 300 displays the TV program according to the original setting. In another embodiment of the step S506D, a new user identification code and new user setting can be added according to the user identification signal Sn.

In an embodiment, the detection unit 320 may continuously detect the users in front of the TV device 300. Once the user is changed, the TV device 300 switches to a proper TV program in order to prevent a Restricted channel, which may be watched by a restricted user, from being watched by a user not allowed to watch the Restricted channel. The TV device 300 can provide the most appropriate TV programs for the users in front of the TV device 300.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A TV control device, for an external TV device, comprising:
 a storage unit, storing a user identification code and user setting data corresponding to the user identification code; and a wireless communication unit, transmitting a control signal to the external TV device according to the user identification code and the user setting data, downloading an application program, storing the application program in the storage unit, and generating the control signal according to the application program, wherein the external TV device determines a TV setting of the external TV device according to the user identification code and the user setting data when the external TV device receives the control signal.

2. The TV control device of claim 1, wherein the wireless communication unit transmits the control signal to the external TV device by a wireless network or a blue-tooth wireless transmission.

3. The TV control device of claim 1, wherein the TV setting comprises a favorite channel setting, an image setting, and an audio setting.

4. A TV control system, comprising:
a TV control device, comprising:
a storage unit, storing a user identification code and user setting data corresponding to the user identification code; and
a wireless communication unit, generating a control signal according to the user identification code and the user setting data; and
a TV device, comprising:
a TV wireless communication unit, receiving the control signal;
a TV storage unit, storing a TV user identification code and a TV user setting data corresponding to the TV user identification code,
a processor unit, determining whether the user identification code is the same as the TV user identification code, and determining a TV setting according to the user identification code corresponding to the control signal; and
a display unit, displaying a related TV program according to the TV setting.

5. The TV control system of claim 4, wherein
the processor unit determines the TV setting according to the TV user setting data when the TV user identification code is the same as the user identification code.

6. The TV control system of claim 5, wherein when the user identification code is different from the TV user identification code, the TV storage unit stores the user identification code and the user setting data and the processor unit determines the TV setting according to the user setting data.

7. The TV control system of claim 5, wherein the processor unit further determines whether the user setting data is the same as the TV user setting data when the TV user identification code is the same as the user identification code, and the processor unit updates the TV user setting data stored in the TV storage unit according to the control signal when the user setting data is different from the TV user setting data.

8. The TV control system of claim 4, wherein the wireless communication unit downloads an application program from a distal server, stores the application in the storage unit, and generates the control signal according to the application program.

9. The TV control system of claim 5, wherein the TV wireless communication unit downloads a TV application program from a distal server, stores the application in the TV storage unit, and determines the TV user setting data according to the TV application program.

10. The TV control system of claim 4, wherein the wireless communication unit transmits the control signal to the TV wireless communication unit by a wireless network or a blue-tooth wireless transmission.

11. The TV control system of claim 4, wherein the TV setting comprises a favorite channel setting, an image setting, and an audio setting.

12. A TV device, comprising:
a detection unit, receiving a user identification signal;
a TV storage unit, storing first user setting data corresponding to a first user identification code; and
a processor unit, determining whether the user identification signal has the first user identification code, and determining a TV setting according to the first user setting data when the user identification signal has the first user identification code; and
a display unit, displaying a related TV program according to the TV setting.

13. The TV control device of claim 12, wherein the TV storage unit further stores second user setting data corresponding to a second user identification code, and the processor unit further determines whether the user identification signal has the second user identification code, wherein the processor unit determines the TV setting according to the first user setting data and the second user setting data when the user identification signal has both the first user identification code and the second user identification code.

14. The TV control device of claim 13, wherein the first user setting data comprises a first TV channel list, and the second user setting data comprises a second TV channel list, and when the detection unit receives the first user identification code and the second user identification code simultaneously, the display unit only displays channels which are comprised in both the first TV channel list and the second TV channel list.

15. The TV control device of claim 12, wherein the detection unit is an image capture device.

16. A TV control method, comprising:
storing a user identification code and user setting data corresponding to the user identification code in a TV control device;
transmitting a control signal to a TV device according to the user identification code and the user setting data;
storing a TV user identification code and TV user setting data corresponding to the TV user identification code in the TV device according to the control signal;
determining whether the user identification code is the same as the TV user identification code;
determining a TV setting of the TV device according to the control signal; and
displaying a related TV program according to the TV setting.

17. The TV control method of claim 16, further comprising:
determining the TV setting according to the TV user setting data when the user identification code is the same as the TV user identification code.

18. The TV control method of claim 17, further comprising:
storing the user identification code and the user setting data in the TV device when the user identification code is different from the TV user identification code; and
determining the TV setting according to the user setting data.

19. The TV control method of claim 17, further comprising:

determining whether the user setting data is the same as the TV user setting data when the TV user identification code is the same as the user identification code; and updating the TV user setting data stored in the TV device according to the control signal when the user setting data is different from the TV user setting data.

20. The TV control method of claim 16, further comprising:

downloading an application program from a distal server and storing the application in the TV control device; and generating the control signal according to the application program.

21. The TV control method of claim 16, further comprising:

downloading an TV application program from a distal server and storing the TV application program in the TV device, and determining the TV user setting data according to the TV application program.

22. The TV control method of claim 16, wherein the TV control device transmits the control signal to the TV device by a wireless network or a blue-tooth wireless transmission.

23. The TV control method of claim 16, wherein the TV setting comprises a favorite channel setting, an image setting, and an audio setting.

\* \* \* \* \*